United States Patent [19]

Öhrle et al.

[11] Patent Number: 4,941,707
[45] Date of Patent: Jul. 17, 1990

[54] METHOD FOR INSTALLING A CAVITY SEAL ELEMENT INSERTED IN A GROOVE AND AN APPARATUS FOR SETTING A SPACING OF THE GROOVE

[75] Inventors: Rolf Öhrle, Herrenberg; Werner Herlemann, Aidlingen, both of Fed. Rep. of Germany

[73] Assignee: Daimler-Benz AG, Fed. Rep. of Germany

[21] Appl. No.: 242,820

[22] Filed: Sep. 12, 1988

[30] Foreign Application Priority Data

Sep. 12, 1987 [DE] Fed. Rep. of Germany ....... 3730742

[51] Int. Cl.$^5$ .............................................. B60J 7/00
[52] U.S. Cl. ...................................... 296/216; 24/295; 29/453
[58] Field of Search ................. 296/216; 24/295, 297; 29/453

[56] References Cited

U.S. PATENT DOCUMENTS

| | | | |
|---|---|---|---|
| 3,067,477 | 12/1962 | Butler | 24/295 X |
| 3,153,975 | 10/1964 | Rapata | 24/295 |
| 4,579,473 | 4/1986 | Brugger | 24/297 X |
| 4,626,023 | 12/1986 | Lutz | 296/216 |
| 4,659,139 | 4/1987 | Hisaminato et al. | 296/216 X |
| 4,667,966 | 5/1987 | Oehrle | 296/216 X |

FOREIGN PATENT DOCUMENTS

| | | | |
|---|---|---|---|
| 3420614 | 12/1985 | Fed. Rep. of Germany | 296/216 |
| 3644492 | 7/1987 | Fed. Rep. of Germany | 296/216 |
| 3634271 | 3/1988 | Fed. Rep. of Germany | 296/216 |
| 2577175 | 8/1986 | France | 296/216 |

*Primary Examiner*—Dennis H. Pedder
*Attorney, Agent, or Firm*—Evenson, Wands, Edwards, Lenahan & McKeown

[57] ABSTRACT

A method and apparatus are proposed for sealing the gap between a rigid sliding roof and a fixed roof region of a motor car surrounding the same by means of a cavity seal element which is housed beneath the fixed roof region by a groove formed between the latter and a rail attached to the roof which exhibits mutually spaced perforations in its upper member. In order to obtain simply a predetermined groove height, a distance or spacing element, which faces the fixed roof region, and the foot part which is constructed as a clip, is let into at least two of the perforations.

11 Claims, 2 Drawing Sheets

METHOD FOR INSTALLING A CAVITY SEAL ELEMENT INSERTED IN A GROOVE AND AN APPARATUS FOR SETTING A SPACING OF THE GROOVE

BACKGROUND AND SUMMARY OF THE INVENTION

The invention relates to a method of sealing the gap between a rigid sliding roof and a fixed roof region of a motor car surrounding the same by means of an all-round cavity seal element which is housed beneath the fixed roof region by a groove formed between the latter and a rail attached to the roof which exhibits mutually spaced perforations in its upper member.

An arrangement of this type to seal a sliding roof is known from German Published Unexamined Patent Application (DE-OS) No. 3,634,271, where the perforations in the rail are used to compensate tolerances relating to a desired contact pressure of the cavity seal element. In order to give this seal element sufficient grip in the housing groove, it is necessary to attach the rail at a predetermined distance from the underside of the fixed roof region. This was done hitherto by the temporary use of distance gauges which had to be fastened before the assembly of the rail and then released again, which means a labor intensive and therefore expensive assembly stage.

An object of the invention is to reduce drastically the outlay for secondary operations for the precise dimensional attachment of the rail.

This object is achieved by inserting spacing elements via clip feet into the perforation, which spacing elements provide a predetermined spacing of the seal anchoring groove walls.

A local increase in the retaining force of the cavity seal element is achieved in preferred embodiments by providing that the head part of the spacing element exhibits a prismatic configuration and is provided with a knife-edge-like edge which bites into the cavity seal element when the latter is pushed in.

Other objects, advantages and novel features of the present invention will become apparent from the following detailed description of the invention when considered in conjunction with the accompanying drawings.

DETAILED DESCRIPTION OF THE DRAWING

Figure 1:
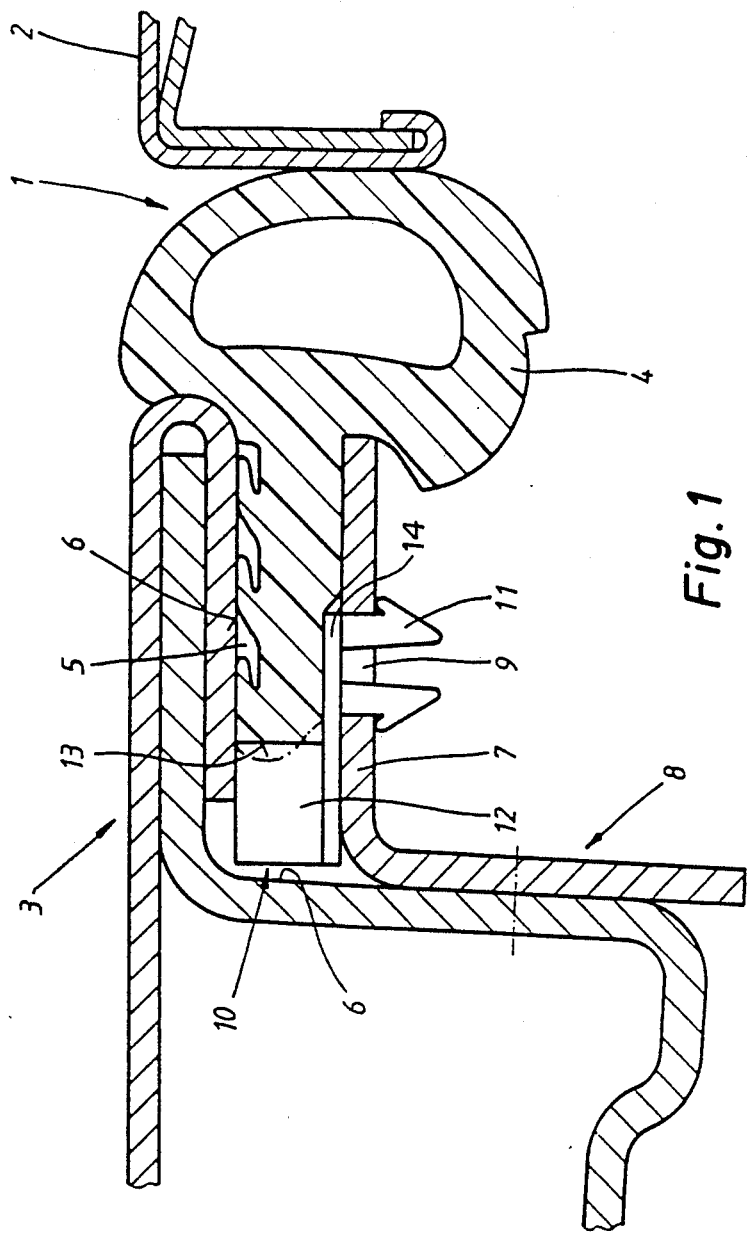
FIG. 1 is a sectional schematic view showing a portion of a vehicle sliding roof sealing arrangement constructed in accordance with a preferred embodiment of the invention.
Figure 2:
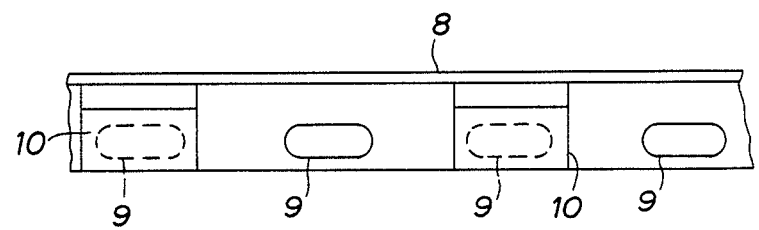
FIG. 2 is a top, schematic view of one embodiment of the spacer element clipped to a rail.

The all-round gap 1 between a rigid sliding roof 2 and a fixed roof region 3 surrounding the same is filled by a cavity seal element 4, which is housed in a groove 5 which is formed by the underside 6 of the fixed roof region 3 and by the upper member 7 of an angle rail 8.

Mutually spaced perforations 9 are arranged in the member 7, so that the contact pressure relative to the cavity seal element 4 can be adapted locally to requirements by widening or constricting individual perforations. So that a predetermined insertion force is not exceeded during the assembly of the cavity seal element, this configuration also provides that the seal element exhibits a sufficient resistance to extracting even in the case of baking to the sliding roof 2, due to weather conditions for example. In order to simply produce a precisely determined height of the groove 5 a spacing element 10 is fitted into at least two perforations 9 (spaced along the gap 1), with a respective foot part 11 clipped in as shown, the foot part 11 preferably comprising a 2-prong clip attached to a plate portion 14 of the spacer element 10. The distance or spacing element 10 is provided with a prismatic head part 12 of predetermined height, which is brought into abutment with the underside 6 of the fixed roof region 3 and exhibits a knife-edge-like edge 13 pointing towards the cavity seal element 4 locally during the assembly of the latter, displacing the material of the cavity seal element 4 in that region, and thus producing a greater retaining force locally.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Method for installing a cavity seal element for sealing a gap between a rigid sliding roof and a fixed roof region of a motor car surrounding the rigid sliding roof, the cavity seal element being housed beneath the fixed roof region in a groove formed between the fixed roof region and a rail attached to the roof and having mutually spaced perforations in an upper member, the method comprising the steps of:

setting a predetermined minimum spacing of the groove with a spacing element having a head part for abutting the fixed roof region and a foot part constructed as a clip for insertion into a perforation of the rail and for attaching the spacing element to the rail:

inserting the foot part of each of at least two spacing elements into a respective one of the spaced perforations of the rail;

attaching the rail with the spaced and inserted spacing elements to the roof; and inserting the cavity seal element into the groove formed between the fixed roof region and the rail when the rail is attached to the roof and spaced by the inserted spacing elements.

2. Method according to claim 1, wherein the head part abuts the fixed roof region to set the predetermined minimum spacing.

3. Method according to claim 1, wherein the head part is not affixed to the fixed roof region.

4. Method of sealing according to claim 1, wherein the head part of the spacing element exhibits a prismatic configuration and is provided with a knife-edge-like edge which bites into the cavity seal element when the latter is pushed in.

5. Method of sealing according to claim 1, wherein a plurality of perforations and associated spacing elements are provided along each side of a sliding roof accommodating fixed roof region.

6. Method of sealing according to claim 1, wherein said clip is an elastic, two-pronged clip attached to a plate portion of the spacing element, which plate-portion extends from the spacing element under the seal element.

7. Apparatus for setting a predetermined minimum spacing of a groove formed between a fixed roof region of a motor car and a rail having mutually spaced perforations in an upper member and attached to the roof, the groove housing a cavity seal element for sealing a gap between a rigid sliding roof and the fixed roof region which surrounds the rigid sliding roof, the apparatus comprising:
- a spacing element having a head part for abutting the fixed roof region and for setting a predetermined minimum spacing of the groove when the rail is attached to the roof and is spaced therefrom by the spacing element; and
- a foot formed as a clip for attaching the spacing element at a perforation of the rail, each of at least two spacing elements being inserted into a respective one of the spaced perforations of the rail when the rail is attached to the roof and spaced by the inserted spacing elements.

8. Apparatus according to claim 7, further comprising holding means for holding the cavity seal member in the groove.

9. Apparatus for sealing according to claim 8, wherein the holding means comprises the head part of the spacing element having a prismatic configuration provided with a knife-edge-like edge which bites into the cavity seal element when the latter is pushed in.

10. Apparatus according to claim 7, wherein a plurality of perforations and associated spacing elements are provided along each side of a sliding roof accommodating fixed roof region.

11. Apparatus according to claim 7, wherein said clip is an elastic, two-pronged clip attached to a plate portion of the spacing element, which plate-portion extends from the spacing element under the seal element.

* * * * *